(12) United States Patent
Pinkas (10) Patent No.: US 6,483,920 B2
(45) Date of Patent: *Nov. 19, 2002

(54) KEY RECOVERY PROCESS USED FOR STRONG ENCRYPTION OF MESSAGES

(75) Inventor: Denis Pinkas, Chaville (FR)

(73) Assignee: Bull, S.A., Louveciennes (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,256

(22) Filed: Oct. 30, 1997

(65) Prior Publication Data

US 2001/0010723 A1 Aug. 2, 2001

(51) Int. Cl.<sup>7</sup> ............................................. H04L 9/00
(52) U.S. Cl. ........................................................ 380/286
(58) Field of Search ........................................ 380/286

(56) References Cited

U.S. PATENT DOCUMENTS 5,241,597 A * 8/1993 Bright .......................... 380/21
5,557,346 A * 9/1996 Lipner et al. ................. 380/21

(List continued on next page.)

FOREIGN PATENT DOCUMENTS

WO 9528784 10/1995
WO 9605673 2/1996

OTHER PUBLICATIONS

Communications of the Association for Computing Machinery, vol. 39, No. 3, Mar. 1, 1996, pp. 33–40, XP000584952, Ganesan R: "How To Use Key Escrow".
Bruce Schneier, Applied Cryptography, 1996, 270–271.*

Primary Examiner—Gilberto Barron
Assistant Examiner—Douglas J Meislahn
(74) Attorney, Agent, or Firm—Miles & Stockbridge P.C.; Edward J. Kondracki (57) ABSTRACT

The present invention relates to a key recovery process used for strong encryption of a message sent by an entity, which message is either to be stored locally or transmitted to another entity, the reading of a message requiring a decryption key which can be reconstructed at least by a trusted third party for key recovery, while added to the message are a compensation field and a compulsory control field which itself comprises at least one key recovery field for allowing at least one trusted third party to supply the decryption keys that enable the encrypted message to be read. This key recovery process is remarkable in that the compulsory control field also comprises, in unencrypted form, the current date as well as the agreement number of the encryption hardware/software and, encrypted under a daily intermediate key, the dialogue key. This key recovery field also comprises, first of all, the identifier of the appropriate trusted third party for key recovery, as a function of the application type, followed by a dialogue key encrypted under the public key or said trusted third party, and lastly, encrypted under the public key of said trusted third party, the serial number of the approved hardware/software and optionally the identifier of the entity and its manager, a working key being used to calculate the daily intermediate key and the period of validity of said working key. Finally, and equally remarkably, during the period of validity of the working key, said working key makes it possible, with only the compulsory control field having been supplied, to calculate in advance for the time period for which the eavesdropping has been authorized, by means of a prescribed formula, daily intermediate keys used to decrypt the dialogue keys, which are themselves used to calculate, from the compensation field and the compulsory control field, the random keys for decrypting the messages.

24 Claims, 2 Drawing Sheets

U.S. PATENT DOCUMENTS

| | | | | |
|---|---|---|---|---|
| 5,557,765 A | * | 9/1996 | Lipner et al. | 380/21 |
| 5,631,961 A | * | 5/1997 | Mills et al. | 380/21 |
| 5,633,928 A | * | 5/1997 | Lenstra et al. | 380/21 |
| 5,640,454 A | * | 6/1997 | Lipner et al. | 380/21 |
| 5,737,419 A | * | 4/1998 | Ganesan | 380/21 |
| 5,745,573 A | * | 4/1998 | Lipner et al. | 380/21 |
| 5,852,665 A | * | 12/1998 | Gressel et al. | 380/30 |
| 5,920,630 A | * | 7/1999 | Wertheimer et al. | 380/25 |
| 6,058,188 A | * | 5/2000 | Chandersekaran et al. | 380/25 |
| 6,160,891 A | * | 12/2000 | Al-Salqan | 380/286 |
| 6,272,632 B1 | * | 8/2001 | Carman et al. | 713/168 |

* cited by examiner

KEY RECOVERY PROCESS USED FOR STRONG ENCRYPTION OF MESSAGES

CROSS REFERENCE TO RELATED APPLICATIONS

The subject application is related to the subject matter of U.S. patent application Ser. No. 08/751,740, filed Nov. 18, 1996, for Method For Authenticating A User Working In A Distributed Enviroment In The Client/Server Mode and U.S. patent application Ser. No. 08/799,629, filed Feb. 12, 1997, for Process For Verifying The Preservation Of The Integrity Of An Unprotected Request Sent By A Client To A Server By Verifying The Integrity Of The Response. Both applications are assigned to the assigned to the assignee of the instant application and were filed in the name of Denis Pinkas.

DESCRIPTION OF RELATED ART

The present invention relates to a key recovery process used for strong encryption of a message sent by an entity, which message is either to be stored locally or transmitted to another entity, the reading of a message requiring a decryption key supplied to at least one trusted third party for key recovery, while the message comprises a compulsory control field which itself comprises a key recovery field for allowing a trusted third party to supply the decryption information that enables the encrypted message to be read.

First of all, it is noted that it is conventionally accepted that an encryption is considered to be strong when its decryption cannot be achieved within a reasonable amount of time without using the key.

Generally, the constant progress in the computerization field results in an increasingly immediate need when it comes to the protection of information. At present, computer security is an integral part of the thorny problems to be solved in this field. Thus, among other things, a problem arises when it is desirable to use encryption techniques to effectively protect sensitive information. In effect, in many countries, the dissemination of encrypted information through public networks is subject to authorization on a case-by-case basis, whereas the need to use such techniques is genuinely felt. The current tendency of international governmental authorities, however, is to authorize anyone to use strong encryption. In exchange for this authorization, the national authorities intend to retain the right of inspection, that is to have the capability to decrypt such communications.

With this type of technique, the stored or transmitted message can only be decrypted when the decryption key used is known. The specific object or technical problem in this case is to make the decryption key known to a predetermined key recovery authority, an authority hereinafter called a "trusted third party" for key recovery. Two techniques are generally used for this purpose.

The first technique consists of depositing a long-term decryption key which will be used to decrypt the working keys or decryption keys. Decryption hardware or software (hereinafter, for the sake of simplification and conciseness, indicated by "decryption hardware/software") then in turn uses this key to decrypt the decryption keys of a message, and thus any person wishing to decrypt the message must possess the copy of this key. This technique has proven effective and practical, for example within a single country, but has serious drawbacks relative to security when the communication is international and/or when an authority of one of the countries in question wishes to eavesdrop on and understand a message sent in one of the countries in question by a person under suspicion. In effect, one country's trusted third party for key recovery is obligated to request another country's trusted third party for key recovery, or the person possessing the copy of the key, [to supply it to it] in order to be able to decrypt the message. In the case where the latter agrees, which is a first restriction, on one hand the eavesdropping is "granted" to the other country's trusted third party for key recovery when this type of intervention is supposed to be discreet and even confidential, and on the other hand, a significant time loss is inevitably caused in obtaining the copy of the key, which is completely inopportune since the message must be understood quickly when it is desirable to act fast with regard to the suspected person before the latter can escape or disappear. Therefore, this technique has substantial limitations for use at an international level due to the counterpart required by the international governmental authorities in authorizing this type of communication, unless the governments involved subscribe to reciprocity agreements, which in this field is not always, in fact rarely, desirable.

The second technique consists not of leaving a long-term decryption key but of allowing the trusted third party for key recovery to decrypt of the decryption key, and hence the encryption key of the message, whether this key is an asymmetric key or a symmetric key. For this purpose, two supplementary fields are added into the message, hereinafter called a compensation field and a compulsory control field, which itself comprises, among other information, at least one field intended for the recovery of the key by an authorized key keeper, hereinafter called a "trusted third party" for key recovery. Thus, in the particular case where a saved encrypted message is stored locally, for example on a disk, only one trusted third party for key recovery is involved, and therefore only one key recovery field is necessary. On the other hand, in the more general case of the transmission of a message between two users, or more generally between two communicating entities, two key recovery fields are necessary, since two trusted third parties for key recovery are involved, that of the country of the sender of the message and that of the country of the recipient of the message. Thus, an international conversation between two interlocutors of country A and country B, respectively, can be eavesdropped on, if this eavesdropping is authorized, by the appropriate intercepting authorities of country A and country B, respectively, without ever being subject to eavesdropping by the authorities of any other country. Consequently, when an eavesdropping is legally authorized, the first key recovery field of the compulsory control field allows eavesdropping by the approved authority of country A, while the second key recovery field allows eavesdropping by the approved authority of country B. These two approved authorities can either be national authorities based in the countries where the communicating entities are physically located, or national authorities of the same nationality as that of the communicating entities. In fact, in order to allow the decryption, one of these two key recovery fields present in the message is first delivered to a trusted third party for key recovery, then the decryption key is delivered by this trusted third party to the national authority, thus allowing it to decrypt the message in its entirety. Currently, it is expected for each country to approve a certain number of trusted third parties for key recovery who are nationals, each of whom is preferably specific to one field, and thus it is the trusted third party approved by a governmental authority that controls and allows the decryption and not the governmental authority directly. A technique of this type is described in the brochure entitled "Commercial Key Escrow (CKE, a trademark of Trusted Information Systems, Inc.): The Path to Global Information Security." This second technique, however, also has a certain number of drawbacks. A first serious drawback is inherent in the fact that it is impossible to notice, in any simple way, that an attempted fraud has been perpetrated by modifying the compulsory control field or modifying the decryption hardware/software. Moreover, this technique does not make it possible to supply in advance daily decryption keys that are usable within, and only within, a predetermined time period, which is a second notable drawback relative to security. Finally, another drawback exists in the fact that the communicating entities are not identified, which does not make it possible to easily distinguish between legal or illegal eavesdropping.

SUMMARY OF THE INVENTION

The object of the present invention is to eliminate the various drawbacks of the different known techniques of the prior art, and to propose a key recovery process that is effective and easy to use, which makes it possible to detect any modification, however minimal, of the compulsory control field, and which allows the provision, even in advance, of daily decryption keys usable only within a predetermined time period.

Figure 1:
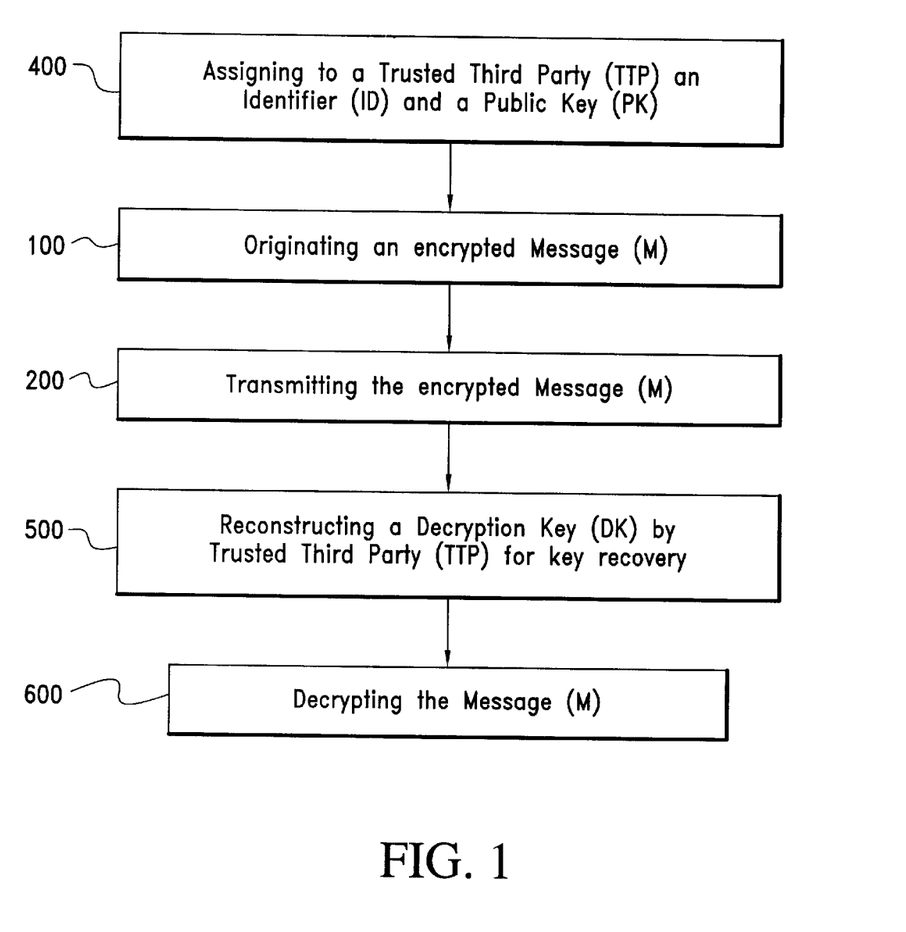
FIG. 1 is a block diagram illustrating the key recovery process according to the present invention.
Figure 2:
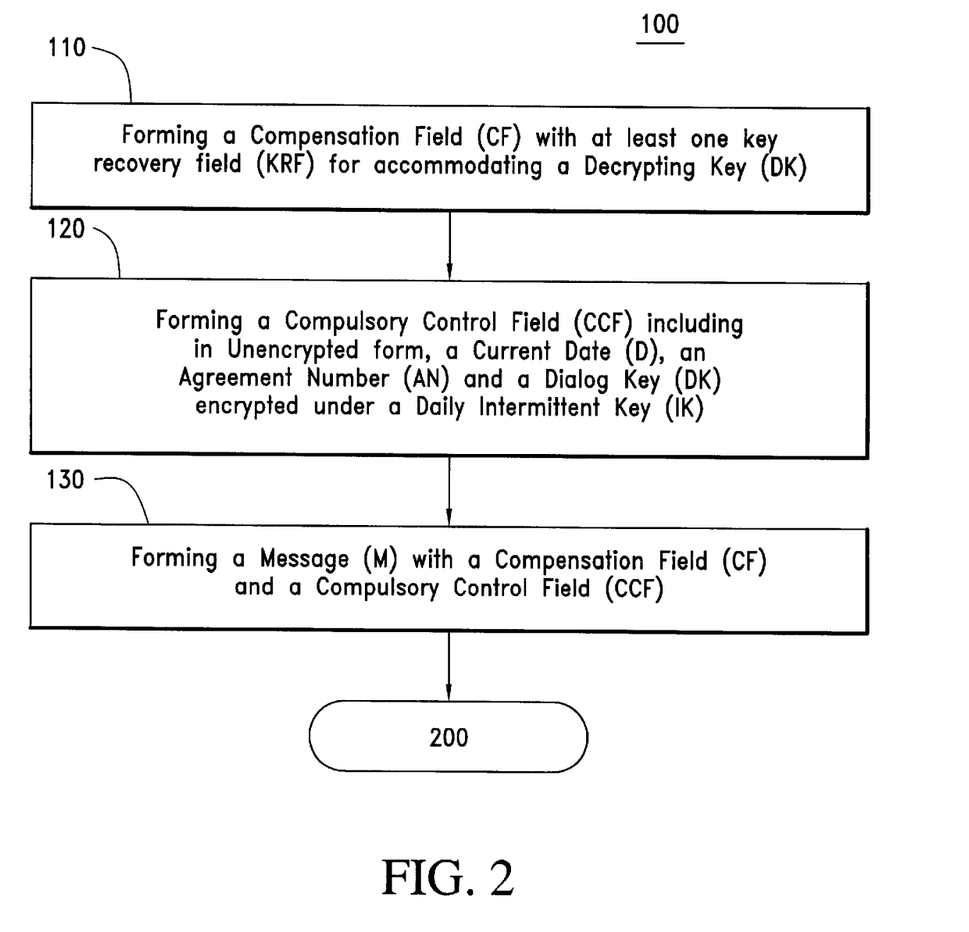
FIG. 2 is a block diagram illustrating the process of forming a message according to the present invention.

FIGS. 1 and 2, illustrate the steps of the key recovery process used for strong encryption of a message (M) according to the present invention. Message (M) is sent by a sending entity (SE) (step 100), wherein the message is either to be stored locally or transmitted to a receiving entity (RE) (step 200). The reading of the message (step 600) requires a decryption key (DK) which can be reconstructed by at least one trusted third party (TTP) for key recovery (step 500). Each trusted party for key recovery is assigned an identifier (Id) and a public key (PK) (step 400). The process of key recovery further includes the steps of forming the message with a compensation field (CF) and a compulsory control field (CCF) (step 130), wherein the compulsory control field (CCF) includes a compulsory field comprising at least one key recovery field (KRF) for allowing the at least one trusted third party to supply the decryption key (DK) that enables the encrypted message (M) to be read (step 110). The compulsory control field (CCF) further comprises, in unencrypted form, a current date (D), an agreement number (AN) for encryption hardware/software and a dialogue key (DiK) encrypted under a daily intermediate key (IK) (step 120).

For this purpose, the key recovery process used for strong encryption of messages (M) mentioned in the preamble is remarkable in that the compulsory control field (CCF) also comprises, in unencrypted form, the current date (D) and the agreement number (AN) of the decryption hardware/software, as well as a dialogue (DIK) key encrypted under a daily intermediate key (IK), which intermediate key (IK) is a key calculated from certain elements of the compulsory control field (CCF) according to a formula that is explained below.

As used herein, the term "strong" relates to ciphering and "strong encryption" means each message is encrypted in a way which tenaciously protects against a fraud.

Thus, according to the concept of the invention and as a result of the technique used, which will be described below, the modification, subsequent to its generation, of the compulsory control field (CCF) correctly generated by the sender renders decryption by the recipient impossible. In fact, an alteration of certain data of the compulsory control field (CCF) for the purpose of preventing the recovery of the decryption key (DK) of the message (M) by any of the trusted third parties makes it impossible to decrypt the message (M). Moreover, the agreement number (AN) of the decryption hardware/software allows the national authority authorizing the trusted third parties (TTP) for key recovery to be given the decryption keys (DK), first of all, to identify the hardware/software to be used for decrypting the message (M). Finally, the current date (D) makes it possible to ensure that the message (M) to be decrypted is transmitted within the correct time period, an incorrect date being detected automatically and immediately without even having to involve the trusted third party (TTP) for key recovery, but also and above all, it is the very foundation of the technique, making it possible to provide decryption keys (DK) in advance as explained below.

According to another characteristic specific to the present invention, the key recovery process is remarkable in that each key recovery field (KRK) first comprises, in unencrypted form, the identifier (Id) of the appropriate trusted third party for key recovery, as a function of the application type, followed by a dialogue key encrypted under the public key of this trusted third party, and lastly, encrypted under the public key (PK) of this trusted third party (TTP), the serial number of the approved hardware/software, a working key and the period of validity of this working key.

In addition, according to a variant, each key recovery field also comprises in the above-mentioned last field the identifier of the user entity or the manager of this hardware/software, also encrypted under the public key of the appropriate trusted third party for key recovery. As a result of this identifier, advantageously and as explained below, the trusted third party for key recovery can directly know the identity of the user entity or the manager without referring to either the hardware/software vendor or its representative or a user entity registration authority.

Finally, in a characteristic way, the working key in combination with, among other things, the date, is used to calculate the daily intermediate key, while this intermediate key is used to encrypt the dialogue key.

Thus, the choice of the trusted third party for key recovery is left to the application, and is therefore a dynamic choice which is a function of the application type or of the context, that is, specific to a field. In this way, the approved hardware/software can "know" the choice and consequently the name of the appropriate trusted third parties for key recovery, a name which can be determined from the context of the application or user data, from the source and destination countries or even from elements of the hierarchical structure of the names. This same principle of dynamic choice ensures that the trusted third party cannot know this choice in advance. The identifier of the trusted third party for key recovery allows the national authority authorizing the trusted third parties to be given the decryption keys to identify the trusted third party for key recovery chosen. In order to verify that the compulsory control field created by the sender has been constituted so as to effectively render the decryption key of the message accessible to the various trusted third parties, the recipient's hardware/software recalculates part of this compulsory control field, that is, it re-encrypts the dialogue key, which it also obtains by means of the key exchange protocol specific to the application, under the public key of each trusted third party and verifies that it obtains an identical result. If this is not the case, it refrains from decrypting the message.

This process, however, does not prevent a recipient's accordingly modified hardware/software from bypassing this control and not refraining from decryption. Thus, as explained below, one of the novelties of the invention resides in the fact that the modification, during their transfer, of the correctly generated compulsory control and compensation fields, no matter what receiving hardware/software is used (compliant or modified), prevents the recipient from decrypting the message.

Normally, the standard key recovery systems are limited to directly encrypting the decryption key of the message under the key of each trusted third party. Consequently, it is necessary to consult a trusted third party in order to decrypt each individual decryption key. Thus, as will be explained below, another novelty of the invention resides in the fact that it makes it possible to supply the decryption authorities in advance with daily intermediate keys, which prevents the decryption authorities from having to use the services of a trusted third party in order to decrypt each message. In order to allow the authorities to receive in advance, the data that make it possible to reconstruct the decryption keys, the process, unlike the known techniques, combines the direct method for recovering the dialogue key by means of the public encryption key of the trusted third party with a second method for recovering the dialogue key using a four-level key hierarchy wherein firstly, the working key, the serial number of the approved hardware/software, the period of validity of this working key, and possibly, depending on the variant presented above, the identifier of the user or the manager of this hardware/software are encrypted under the public key of each trusted third party for key recovery, after which the working key, specifically in combination with the date, is used to calculate the daily intermediate key, then the daily intermediate key is used to encrypt a dialogue key. Since the working key is encrypted under the public key of the trusted third party for key recovery, it can be decrypted by this trusted third party and by this entirety alone, since furthermore, this working key cannot be used directly, but only indirectly, to decrypt the message. Consequently, in a characteristic way, the approved decryption hardware/software will calculate the daily intermediate key by means of a one-way function (also called a "one-way hash function" by one skilled in the art) from the working key, and from the compulsory control field, that is, the current date, the agreement number and two key recovery fields. The two communicating entities normally exchange a decryption key according to a protocol of their own. Depending on the method used, the key exchanged is not considered to be this decryption key, but to be precisely the above-mentioned dialogue key. This dialogue key is therefore also directly accessible to the designated trusted third parties, because it is encrypted directly under their public key, but also because this dialogue key is also encrypted under a daily intermediate key. The two communicating entities calculate the decryption key from a one-way function using as parameters the dialogue key and the result of a collision-proof one-way function calculated on all of the components of the compulsory control field, the result then being combined with the compensation field by means of an exclusive OR.

Each of the trusted third parties performs the calculation of the decryption key in the same way, and is therefore capable of calculating the decryption key. The compensation field makes it possible to use a decryption key of any value, which can be the "private key" type for an asymmetric algorithm or the "secret key" type for a symmetric algorithm. In effect, the sender of the message adjusts the value of the key by means of the compensation field, since the result of the one-way function using as parameters the dialogue key and the result of a collision-proof one-way function calculated on all of the components of the compulsory control field cannot be predictable. Thus, due to the fact that the decryption key is a function of the compulsory control field and the compensation field, used jointly by the communicating entities and the trusted third parties, and that as indicated above, any alteration of the compulsory control field constituted normally at the source by the sender, makes it impossible to decrypt the message, the object—and this is fundamental—being to render the decryption key false for the recipient of the message as a result of any modification. In effect, a modification, however minimal, of any of the fields of the compulsory control field has the result of modifying the decryption key, thus preventing the decryption and therefore the comprehension of the semantics of the message. It is important to note that the present process makes it possible to choose, for each message, a different and completely random decryption key.

DESCRIPTION OF THE PREFERRED EMBODIMENTS

To provide a better understanding of the concept of the invention, the following description, which is understood to be non-limiting, will clearly explain, by specifying the vocabulary used by one skilled in the art and the various persons involved in the different phases of implementation, the environment in which the invention may be applied and how it may be implemented.

Thus, a first phase is comprised of the application for the decryption hardware/software agreement. To this end, characteristically, the decryption hardware/software vendor requests an agreement with the hardware/software certification authority (for example, in France, the SCSSI—Service Central de la Sécurité de Systèmes d'Information, or Central Service for Information Systems Security), the latter in return providing, according as the hardware/software is effectively approved, an agreement number for this decryption hardware/software. The vendor must provide, in addition to the decryption hardware/software, two specific types of hardware/software, a first hardware/software used by a national decrypting authority, an authority hereinafter called, for the sake of conciseness, a "decrypting authority," and a second hardware/software used by the trusted third party for key recovery. The decrypting authority uses the first hardware/software to extract the useful part of the compulsory control field and then, using data sent by the trusted third party for key recovery, to decrypt the encrypted data. The trusted third party for key recovery uses the second hardware/software to supply the decryption key or keys to the decrypting authority. In effect, the agreement number appears in unencrypted form in the compulsory control field in order to allow both the decrypting authority and the trusted third party for key recovery to identify the hardware/software to be used to process the message.

A second phase consists of the application for registration of a strong encryption user entity with a hardware/software vendor or its representative, or even with a user entity registration authority that has been delegated by the vendor to perform this operation. By way of example, in France, law No. 96-659 of Jul. 26, 1996 for the regulation of telecommunications, in Article 17, provides that ". . . the authorization may be subordinate to the obligation for the vendor to communicate the identity of the purchaser . . ." A prior declaration of use of the hardware/software by each user is therefore necessary. Remarkably, to allow itself to be registered, the user entity communicates to the hardware/software vendor, its representative, or a user entity registration authority the agreement number of the hardware/software, the serial number of the hardware/software, its user entity name, the coordinates of the manager of the entity, and the current date which will be used for the validation of the decryption hardware/software. It must be noted at this point that the master key specific to the hardware/software in question makes it possible, from the serial number of the hardware/software, to calculate a so-called diversified key and to validate each type of hardware/software so as to authorize its use during a given period. The object of the master key is not to allow the decryption of the messages but to allow the hardware/software number to be associated with an entity or user name and to authorize the use of the approved hardware/software only after prior registration, and hence communication of the identity of the user entity. The hardware/software vendor, its representative, or a user entity registration authority responds to the user entity by communicating to it right to use the hardware/software, plus—which is also fundamental—information that makes it possible to customize the hardware/software after its sale, most particularly the public key of the national authority for approving trusted third parties for key recovery. The right of use, which is valid for a predetermined period, is supplied in the form of a key, which is in fact a character string to be entered for example on the keyboard of a computer and which, if it is correct, makes it possible to authorize the hardware/software to operate for the authorized time period. This right of use, which is embedded under the so-called diversified key, integrity being guaranteed as a result of this embedding under the so-called diversified key, is constituted by a utilization period and by the public key of a national authority for approving trusted third parties for key recovery, which can also be added after the purchase of the hardware/software. In effect, the hardware/software can be sold in two ways, either ready to be used in one country, in which case it comprises the public key of a national authority for approving trusted third parties for key recovery, or ready to be used in any country that recognizes it as valid, in which case the public key is communicated at the moment it is placed in service. The public key of the national authority for approving trusted third parties for key recovery enables the hardware/software to verify the certificates of the trusted third parties for key recovery approved for the countries in which the hardware/software is approved, as explained below. Such a certificate can, in particular, take the form of an X.509 certificate, as described in the ITU-T (formerly CCITT) standard of the same name. It allows the authority for approving trusted third parties for key recovery to guarantee, for a given duration, the association between the name of a trusted third party for key recovery, the value of its public key and the encryption algorithm to be used. The hardware/software vendor, its representative or a user entity registration authority maintains, in an audit file, the record of the registration of this user entity by storing the hardware/software agreement number, the hardware/software serial number, the name of the entity and the coordinates of the manager of the entity. The hardware/software vendor, its representative or a user entity registration authority may also be required to transmit this audit file regularly (or when expressly requested) to a national governmental authority. This file can then be obtained either from the hardware/software vendor, its representative, a user entity registration authority, or from this national governmental authority. In particular, it is possible, but not indispensable, for the same agency to combine the roles of trusted third party for key recovery and user entity registration authority.

Furthermore, according to the variant proposed above, the right of use comprises a supplementary piece of information, which is also embedded under the diversified key. This supplementary information is constituted by the identifier of the user entity or that of the manager of the approved decryption hardware/software. Depending on the circumstances and the countries, the identifier can have different values. It can be for example a national ID card number, a passport number or even, in the case of the United States of America, a driver's license number. When this supplementary information is returned with the right of use, then the approved decryption hardware/software transfers it into the encrypted part of each key recovery field as explained above. In this case, the trusted third party for key recovery can, by means of this identifier, directly know the identity of the user entity or the manager without referring to the vendor or its representative, or to a user entity registration authority.

Likewise, all trusted third parties for key recovery must request approval from the national authority for approving trusted third parties for key recovery. When a trusted third party for key recovery is approved by this authority, it is added to the list of an index of approved trusted third parties for key recovery and a certificate of approval is produced in electronic form, for example in the form of a certificate in the X.509 format, in order to guarantee the identity of the trusted third party for key recovery, the value of the public key of the trusted third party for key recovery, the decryption algorithm to be used, and the duration of this guarantee. The national authority for approving trusted third parties for key recovery also issues, though indirectly, international certificates of approval for trusted third parties for international key recovery through the national authorities for approving trusted third parties for key recovery of other countries with which a recognition exists. This occurs when one national authority for approving trusted third parties for key recovery recognizes another national authority for approving trusted third parties for key recovery. In this case, this national authority for approving trusted third parties for key recovery issues a certificate (for example in the X.509 format) guaranteeing the value of the key of the other national authority for approving trusted third parties for key recovery. Thus, step by step, according to a technique known as "certificate chaining," it is possible, knowing the public key of one country's national authority for approving trusted third parties for key recovery, to validate the public key of another country's national authority for approving trusted third parties for key recovery, this other country itself validating the public key of a trusted third party for key recovery of this other country. In an indirect way, the public key of the trusted third party for key recovery of another country is thus validated by the knowledge of only one public key specific to the national authority for approving trusted third parties for key recovery of a single country. It is this single public key that is transmitted during the validation of the hardware/software.

The operation of the approved decryption hardware/software is described below. It can be implemented without any prior deposit of a key having taken place. The approved decryption hardware/software, as explained above, in order to be used by a communicating entity, will obtain from the identifiers of the countries of origin, for each communicating country, the public keys of the appropriate trusted third parties for key recovery, which in some cases can be chosen by default, each trusted third party for key recovery being provided with a certificate (for example in the X.509 format) issued by the national approving authority and listed in an index. Once the public keys of both appropriate trusted third parties for key recovery have thus been obtained, the hardware/software can create the compulsory control field according to the characteristics of the present invention.

Various principles related to this technique follow from the above description. Thus, no approved hardware/software is operational at the time of purchase, but must be validated by the hardware/software vendor, its representative, or a user entity registration authority operating in a country, and a user entity must necessarily obtain authorization to use approved hardware/software by applying to any one of the countries in which it is approved. In addition, the right of use of the hardware/software is valid not only for the country in which it was approved, but also for the other countries with which a recognition exists. A country may be recognized at any time without there being a need to recontact the entity registration authority, this being obtained by a key certification with two hierarchical levels. Likewise, it is impossible to use an approved hardware/software unless two approved national, or national and international, trusted third parties for key recovery are used.

An equally fundamental characteristic is explained below, which characteristic relater to the frequency with which the working key is changed. In the key recovery process according to the invention, during the period of validity of the working key, this working key makes it possible, using only the compulsory control field, to calculate and supply in advance the daily intermediate keys that make it possible to decrypt each individual dialogue key and likewise to decrypt all of the messages for the time period indicated by the period of validity of the working key, which is encrypted under the public key of each trusted third party for key recovery, this period being compared to the legal eavesdropping period requested by the decrypting authority so as to be able to issue in advance the set or sub-set of daily intermediate keys requested.

In effect, the frequency with which the working key is changed affects the speed of the decryption and the imperatives for real-time communication between the decrypting authority and the trusted third party for key recovery. Several possibilities will be considered. A first possibility is comprised of retaining the same working key for one session, a session being able to last for example from 2 to 3 hours, and thus to encrypt each message with a different key. In this case, it is appropriate to consult the trusted third party for key recovery for each new session, thereby requesting a key for each session, which is particularly time-consuming and inconvenient. An antithetical possibility is comprised of retaining the same key indefinitely, or at least for a very long time, for encrypting all messages, but this solution is dangerous due to the fact that an authority that possessed such a key could continue to eavesdrop on and decrypt any message, even after the authorized eavesdropping period, which is limited in time, is over, which would run totally counter to the desired object. A middle solution, which would seem appropriate in some cases, particularly when the granularity of the eavesdropping period is one day, would be to retain the same key for one entire day in order to avoid having to consult the trusted third party for key recovery many times in order to allow the decryption of all the day's messages. Finally, the most advantageous solution, which is recommended whenever possible, is comprised of retaining the same working key for a period of time equal to at least one week. In effect, in this case the working key makes it possible to calculate in advance the daily keys for decrypting all of the messages for the time period indicated by the period of validity of the working key, which is encrypted under the public key of each trusted third party. This period must be compared with the legal eavesdropping period requested by the decrypting authority in order to issue in advance the set or sub-set of decryption keys requested. This preferred solution is truly novel and particularly advantageous, since it allows the issuing of all the keys required for the decryption of messages for the entire eavesdropping period in question; to obtain these keys, it is only necessary to supply one compulsory control field. More precisely, the decrypting authority that declares its intention to eavesdrop on a given entity for a predetermined period supplies to a trusted third party the compulsory control field, the daily intermediate key being defined as a function of, among other things, the working key and the current date. When the trusted third party for key recovery, which knows the working key, learns that this authority wants to eavesdrop on the given entity for the predetermined period, this authority having sent it the compulsory control field, it can supply a set of daily intermediate keys (but does not in any case supply the working key).

At present, it is possible to provide an example of an interception and decryption by an intercepting authority during a legal eavesdropping phase. Initially, on request, the judicial authority (in France, the examining magistrate or in the case of "security interceptions," the prime minister) authorizes an interception for a given entity and a given time period. When the intercepting authority determines that the intercepted information is encrypted, it must then determine the name of the authorized decrypting authority in order to transmit to it the court order and the intercepted data. The decrypting authority must in turn determine the appropriate trusted third party for key encryption by consulting the header of the compulsory control field which contains, in particular, the key recovery field in which the name of the selected approved agency appears in unencrypted form. The decrypting authority communicates the desired duration for the decryption and optionally the name or the identifier of the entity to be eavesdropped on, accompanied by the name of its manager, knowing that the encrypted message need never be communicated. Moreover, it is not within the competence of the trusted third party for key recovery, which does not have to have knowledge of the court order and knows only the decryption period requested and authorized and optionally the name or the identifier of the entity to be eavesdropped on accompanied by the name of its manager, to evaluate the validity of the eavesdropping requested. It must be noted at this point that the knowledge of the desired eavesdropping period makes it possible to institute an a posteriori check by a control commission of the content and the validity of the request expressed by the decrypting authority, this check being possible relative to the identity of the entity eavesdropped on and to the duration of the eavesdropping period the control commission being, for example in France, the Commission de Contrôle des Interceptions de Sécurité (CCIS), or Commission for the Control of Security Interceptions. In the case where the identifier of the user entity does not appear in the encrypted part of the key recovery field, then the control commission also requests either the original vendor, its representative, the user entity registration authority, or a national governmental authority to supply it with the relation between the entity name and the agreement and serial numbers of the hardware/software. For its part, depending on the duration of the desired eavesdropping period, the trusted third party for key recovery issues to the decrypting authority the decryption key of the message or the daily intermediate keys that make it possible to decrypt each individual message decryption key for the period in question. The trusted third party for key recovery also performs an audit of the information communicated by the decrypting authority, storing it in an audit file, particularly the decryption period requested and, if communicated, the name or identifier of the entity to be eavesdropped on, accompanied by the name of its manager, associating with it the agreement number of the approved software/hardware, the serial number of this hardware/software, and the duration of the eavesdropping period. The a posteriori check performed by the control commission is then carried out using the audit file thus constituted and made available to it by the trusted third party for key recovery, and in the case where the identifier of the user entity does not appear in the encrypted part of the key recovery field, the relation between the serial number of the hardware/software and the user entity made available by the vendor, its representative or the user entity registration authority, comparing this information to the information provided by the decrypting authority, in particular the original court order. According to the variant proposed above, the a posteriori check carried out by the control commission is executed directly by comparing the information contained in the audit file constituted by the trusted third party for key recovery to the information in the audit file maintained by the decrypting authority and finally the original court order produced by the decrypting authority. In both cases, the decrypting authority may thus have to justify its eavesdropping sessions by showing that the latter in fact correctly correspond to those provided for by the original court order, all of which information is made available to the control authority.

It is absolutely remarkable to note that the serial number of the hardware/software, and possibly the name or the identifier of the entity to be eavesdropped on, accompanied by the name of its manager, appear in each part encrypted under the public key of a trusted third party for key recovery and not in the unencrypted field. This prevents entities that are not authorized to eavesdrop from being able to identify those involved by means of the compulsory control field. If this characteristic is not necessary, then this information can be placed in the "unencrypted" part, but it must be taken into account in the calculation of the encryption key. This information, once decrypted by the trusted third party for key recovery, is systematically delivered to the decrypting authority. When only the serial number of the hardware/software appears in the encrypted part, it makes it possible, by accessing the file maintained by the user entity registration authority or by the hardware/software vendor or its representative, to identify the entity and the manager of the entity.

It must also be noted that a certain number of limitations are placed on the powers of the intercepting and decrypting authorities relative to the legality of the eavesdropping. Thus, while not preventing them from doing so, it is appropriate to verify a posteriori that these authorities have not had access to the semantics of communications relative to an entity that does not fall within the scope of a legal inspection, and access to the semantics of communications outside the periods authorized by the judicial authority. For this reason, as regards access to the semantics of communications relative to another entity, either the serial number of the approved hardware/software makes it possible to indirectly verify the identity of the entity or person being eavesdropped on, by comparing it to the information supplied by the user entity registration authority or the hardware/software vendor or its representative, which is constituted by the serial number of the approved hardware/software associated with a list of entities, or the identifier of the entity or that of its manager, when it is present in each encrypted part of the compulsory control field, makes it possible to directly verify the identity of the entity or person being eavesdropped on. The relation between the serial number of the approved hardware/software and the name of the entities is maintained by the user entity registration authorities. The control commission can request the content of this relation from the entity registration authorities, whether national or foreign. When it comes to foreign countries, it is understood that this guarantee of an a posteriori check depends on the willingness of the foreign vendor or the foreign entity registration authority to supply this relation. If a vendor or an entity registration authority of a foreign country refuses to supply this relation, the a posteriori check cannot be carried out, and consequently the guarantee that illegal eavesdropping has not been perpetrated cannot be offered in this country. As regards access to communications not included in the authorized eavesdropping period, it is the current date information that is systematically used during the calculation of the encryption key, and hence the decryption key.

In conclusion, according to the concept of the invention and as a result of the technique used, any alteration of an element of the compulsory control field originally constituted normally by the sender makes it impossible to decrypt the message, the object being to render the decryption code false as a result of any modification of an initially correct control field. In effect, any modification, however minimal, of any of the fields of the compulsory control field results in modifying the decryption key, thus preventing the decryption, and hence the eavesdropping, of the message. The agreement number of the hardware/software allows the national decrypting authority to identify the hardware/software to use to decrypt the message. Finally, the current date makes it possible to ensure that the message to be decrypted is transmitted within the proper time period, an incorrect date being detected automatically. The choice of the trusted third party for key recovery is left to the application, and is therefore a dynamic choice that is a function of the application type. Thus, the approved hardware/software can "know" the choice and consequently the name of the appropriate trusted third parties for key recovery. This same principal of dynamic choice ensures that the trusted third party cannot know this choice in advance. The identifier of the trusted third party for key recovery allows the national authority authorizing the trusted third parties to identify the trusted third party for key recovery chosen. The dialogue key is encrypted under the public key of the trusted third party for key recovery, and can therefore be decrypted by this trusted third party. Likewise, the working key is encrypted separately under the public key of the trusted third party for key recovery, and can therefore be decrypted by this trusted third party and by it alone. Moreover, the frequency with which the working key is changed can be carefully chosen, the most advantageous solution, and the one recommended herein, being to retain the same working key for a period of time equal to at least one week. In this case, the working key makes it possible, for the time period chosen, to calculate in advance the daily intermediate keys, thus making it possible to reconstruct each individual decryption key of all the messages for the time period for which the eavesdropping is authorized. This solution is original and advantageous because it allows the issuing of all of the keys required for the decryption of the messages for the entire time period in question; to obtain these keys, it is only necessary to supply the compulsory control field and the desired eavesdropping period. Likewise, according to the present invention, it is possible to distinguish, indirectly but easily, between legal and illegal eavesdropping. Finally, according to a variant in which each key recovery field also comprises the identifier of the user entity or of the manager of the hardware/software, the trusted third party for key recovery can directly know the identity of the user entity or the manager without referring to the hardware/software vendor or to a user entity registration authority.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A key recovery process used for strong encryption of a message (M) sent by an entity (SE), wherein the reading of the message requires a decryption key (DK) for key recovery which can be reconstructed by at least one trusted third party (TTP), each said trusted third party being assigned an identifier (Id) and a public key (PK), the process comprising the steps of:

sending by the entity (SE) the message (M), which message is either to be stored locally or transmitted to another entity (RE), wherein neither the entity (SE) nor the entity (RE) necessarily establishes at least one secret encryption key and at least one public encryption key corresponding to the at least one secret encryption key, and forming the message with a compensation field (CF) and a compulsory control field (CCF), the compulsory field comprising at least one key recovery field (KRF) for allowing the at least one trusted third party to supply the decryption key (DK) that enables the encrypted message (M) to be read, the compulsory control field (CCF) further comprising, in unencrypted form, a current date (D), an agreement number (AN) for encryption hardware/software and a dialogue key (DiK) encrypted under a daily intermediate key (IK).

2. The key recovery process according to claim 1, characterized in that each key recovery field comprises, in unencrypted form, the identifier of the trusted third party for key recovery, the identifier being a function of an application type, followed by the dialogue key encrypted under the public key of said trusted third party for key recovery and lastly, encrypted under the public key of said trusted third party for key recovery, a serial number of an authorized hardware/software, a working key and the period of validity of said working key.

3. The key recovery process according to claim 2, characterized in that each key recovery field further comprises an identifier of an authorized user entity of said hardware/software, said authorized user entity identifier being encrypted under the public key of said trusted third party for key recovery.

4. The key recovery process according to claim 2, characterized in that the working key combination with at least the current date, is used to calculate the daily intermediate key, said daily intermediate key being used to encrypt the dialogue key, thus enabling each trusted third party for key recovery to calculate, in advance, daily intermediate keys and to issue said daily intermediate keys to a decrypting authority for a predetermined legal eavesdropping period.

5. The key recovery process according to claim 3, characterized in that the working key combination with at least the current date, is used to calculate the daily intermediate key, said daily intermediate key being used to encrypt the dialogue key, thus enabling each trusted third party to calculate daily intermediate keys in advance and issue said daily intermediate keys to a decrypting authority for a legal eavesdropping period.

6. The key recovery process according to claim 3, comprising calculating the decryption key by the authorized decryption hardware/software by means of a one-way function using as parameters the dialogue key and the result of a collision-proof one-way function calculated on all components of the compulsory control field, said result being combined with the compensation field by means of an exclusive OR, thus making it possible to use a decryption key of any value, which decryption key may be a "private key" type for an asymmetric algorithm, or a "secret key" type for a symmetric algorithm, and adjusting the value of the decryption key by a sender of the message by means of the compensation field.

7. The key recovery process according to claim 4, characterized in that each trusted third party for key recovery is capable of calculating the decryption key by means of a one-way function using as parameters the recovered dialogue key, either encrypted under its own public key or encrypted under the daily intermediate key, and the result of a collision-proof one-way function calculated on all components of the compulsory control field, said result being combined with the compensation field by means of an exclusive OR.

8. The key recovery process according to claim 5, characterized in that each trusted third party for key recovery is capable of calculating the decryption key by means of a one-way function using as parameters the recovered dialogue key, either encrypted under its own public key or encrypted under the daily intermediate key, and the result of a collision-proof one-way function calculated on all components of the compulsory control field, said result being combined with the compensation field by means of an exclusive OR.

9. The key recovery process according to claim 4, characterized in that the trusted third parties for key recovery and a recipient of the encrypted messages use the same calculation process for the decryption key, which is a function of the compulsory control field and the compensation field, and from that point on any alteration of said compulsory control and compensatory fields prevents correct decryption by the recipient of the encrypted messages by means of this decryption key.

10. The key recovery process according to claim 5, characterized in that the trusted third parties for key recovery and a recipient of the encrypted messages use the same calculation process for the decryption key, which is a function of the compulsory control field and the compensation field, and from that point on any alteration of said compulsory control and compensatory fields prevents correct decryption by the recipient of the encrypted messages by means of this decryption key.

11. The key recovery process according to claim 1, characterized in that two specific types of encryption hardware/software are utilized in order to implement said key recovery process comprising a first encryption hardware/software used by a national decrypting authority to extract a useful part of the compulsory control field and then, using data returned by the trusted third party for the key recovery to decrypt the encrypted data, and a second encryption hardware/software used by the trusted third party for key recovery to supply the decryption key or keys to the decrypting authority.

12. The key recovery process according to claim 1, wherein, in order to implement said process and in order to validate the hardware/software, further comprising communicating from the entity using strong decryption, which entity requests to be registered with a hardware/software vendor, the identity of a representative or a user entity registration authority to said hardware/software vendor, its representative or a user entity registration authority the agreement number of the hardware/software, a serial number of the hardware/software, its entity name, the coordinates of a manager of the entity and the current date.

13. The key recovery process according to claim 12, further comprising, in order to implement said process, during the registration of the user entity, strong in audit files by the vendor, the hardware/software agreement number, the hardware/software serial number, the name of the entity and the coordinates of the manager of the entity.

14. The key recovery process according to claim 12, further comprising, in order to implement said process and to validate the utilization of each hardware/software type for a predetermined period, calculating by a master key specific to the hardware/software in question, from the serial number of said hardware/software, a diversified key, at which point the hardware/software vendor, its representative or a user entity registration authority communicates to the user entity the right to use the hardware/software, which right is valid for a predetermined period, plus information for customizing the hardware/software and a right to use the hardware/software which allows the hardware/software to function for the predetermined period, said information being supplied in the form of information embedded under diversified key and constituted by a utilization period, the public key of a national authority for approving trusted third parties for key recovery, and the identifier of the user or the manager of said hardware/software.

15. The recovery process according to claim 13, further comprising, in order to implement said process and to validate the utilization of each hardware/software type for a predetermined period, calculating by a master key specific to the hardware/software in question, from the serial number of said hardware/software, a diversified key, at which point the hardware/software vendor, its representative or a user entity registration authority communicates to the user entity the right to use the hardware/software, which right is valid for a predetermined period, plus information for customizing the hardware/software, a right to use the hardware/software, which allows the hardware/software to function for the predetermined period, said information being supplied in the form of information embedded under the diversified key and constituted by a utilization period, the public key of a national authority for approving trusted third parties for key recovery, and the identifier of the user or the manager of said hardware/software.

16. The key recovery process according to claim 14, further comprising in order to implement said process, requesting approval of all trusted third parties for key recovery from the national authority for approving trusted third parties for key recovery, and when a trusted third party for key recovery is approved by said national authority, adding said third party to a list of an index of approved trusted third parties for key recovery, producing a certificate of approval in electronic form guaranteeing identity of the trusted third party for key recovery, the value of the public key of the trusted party for key recovery, an encryption algorithm to be used and a period of duration of said guarantee.

17. The key recovery process according to claim 16, further comprising in order to implement said process, verifying by the hardware/software and the public key of a national authority for approving trusted third parties for key recovery the certificates of approved trusted third parties for key recovery for countries in which said hardware/software has been approved, such certificates allowing the authority for approving trusted third parties for key recovery to guarantee, for a given period, an association between the name of a trusted third party for key recovery, the value of its public key and the encryption algorithm to be used.

18. The key recovery process according to claim 17, further comprising, in order to implement said process, from knowledge of only one public key specific to the national authority for approving the trusted third parties for key recovery of one country, indirectly issuing by said national authority international certificates of approval to trusted third parties for international key recovery through the national authorities for approving trusted third parties for key recovery of other countries with which a recognition exists, so that when one national authority for approving trusted third parties for key recovery recognizes another national authority for approving trusted third parties for key recovery, said one national authority sends a certificate guaranteeing the value of the key of the other national authority for approving trusted third parties for key recovery, and thus, step by step, knowing the public key of a country's national authority for approving trusted third parties for key recovery, the public key of another country's national authority for approving trusted third parties for key recovery is validated, said another country itself validating the public key of a trusted third party for key recovery of said another country.

19. The key recovery process according to claim 18, further comprising automatically obtaining from identifiers of the countries of origin, for each communicating country, the public keys of the appropriate trusted third parties for key recovery, when the authorized decryption hardware/software is used without a prior deposit of a key having taken place, each trusted third party for key recovery being provided with a certificate issued by a national approving authority and listed in an index, and once the public keys of both appropriate trusted third parties for key recovery have thus been obtained, the hardware/software creates the compulsory control field.

20. The key recovery process according to claim 19, further comprising, calculating and supplying in advance, using only the compulsory field, the daily intermediate keys for decrypting each individual dialogue key, and all of the messages for the time period indicated by the period of validity of the working key during the period of validity of the working key, said working key being encrypted under the public key of each trusted third party for key recovery, and comparing said time period to a legal eavesdropping period requested by the decrypting authority so as to be able to issue in advance a set or sub-set of daily intermediate keys requested.

21. The key recovery process according to claim 1, further comprising, carrying out a posteriori check by a control commission of the content and the validity of the request expressed by a national decrypting authority relative to the identity of an entity eavesdropping on and to the duration of the eavesdropping period, for which purpose the control commission requests either the vendor or the entity registration authority to supply the control commission with the relation between the entity name and the agreement and serial numbers of the hardware/software, while the trusted third party for key recovery performs an audit of information communicated by a decrypting authority, stores said audit in an audit file, and associates with said audit the agreement number of the hardware/software, a serial number of said hardware/software and the duration of the eavesdropping, the a posteriori check being carried out by a control commission using the audit file thus constituted and made available to said control commission by the trusted third party for key recovery, and comparing the relation between the serial number of the hardware/software and the user entity made available by a vendor or an entity registration authority, to the information supplied by the decrypting authority.

22. The key recovery process according to claim 1, further comprising, carrying out an a posteriori check, by a control commission, of the content and the validity of a request expressed by a national decrypting authority relative to the identity of an entity eavesdropped on and to the duration of the eavesdropping period, for which purpose the control commission requests from the trusted third party for key recovery the identifier of the entity, the agreement and serial number of the hardware/software, the information communicated by the decrypting authority, and the duration of the eavesdropping requested by the decrypting authority, storing all of said information in an audit file maintained by the trusted third party for key recovery, the a posteriori check being carried out by the control commission using the audit file thus constituted and made available to it by the trusted third party for key recovery, the audit file maintained by the decrypting authority and finally, an original court order produced by the decrypting authority.

23. The key recovery process according to claim 4, characterizes in that the control commission verifies a posteriori whether the decrypting authorities have had access to semantics of communications relative to an entity that does not fall within the scope of a legal inspection, and further comprising indirectly verifying the identity of the entity being eavesdropped on by comparing the serial number of the authorized hardware/software to information supplied by the entity registration authority or the vendor, which information is constituted by the serial number of the approved hardware/software associated with a list of entities, or the identifier of the entity and directly verifying the identity of the entity being eavesdropped on from information present in each encrypted part of the compulsory control field, the content of which can be requested by the control commission from entity registration authorities, whether national or foreign.

24. The key recovery process according to claim 23, characterized in that the control commission can verify a posteriori that the decrypting authorities have not had access to the semantics of communications outside the periods authorized by a judicial authority, as a result of current date information that is systematically used during calculation of the encryption key and hence the decryption key.

\* \* \* \* \*